United States Patent

Benno

[15] 3,654,977

[45] Apr. 11, 1972

[54] LIVESTOCK FEEDING MACHINE

[72] Inventor: Edward L. Benno, Route 1, P.O. Box 198, Grayslake, Ill. 62844

[22] Filed: Mar. 17, 1970

[21] Appl. No.: 20,269

[52] U.S. Cl. ....................................................146/70.1
[51] Int. Cl. ....................................A01f 29/00, A01f 31/00
[58] Field of Search ...............146/70.1, 79, 123; 83/201.08, 83/201.13; 143/22, 32 Q

[56] References Cited

UNITED STATES PATENTS 3,509,924  5/1970  Newhouse, Jr. .......................146/70.1
3,344,830  10/1967  Longman..........................83/201.13 X
2,685,900  8/1954  Cross ..............................146/70.1 UX Primary Examiner—Willie G. Abercrombie

[57] ABSTRACT

A livestock feeding machine comprising a mobile platform carrying bales of hay and a bale cutter wherein the bale cutter comprises a plurality of elongated linear type cutting assemblies arranged above a discharge conveyor and operating to cut bales of hay gravity fed thereto and drop the cut hay on the discharge conveyor.

2 Claims, 2 Drawing Figures

PATENTED APR 11 1972　　　　　　　　　　　　　　3,654,977

Inventor:
Edward L. Benno

LIVESTOCK FEEDING MACHINE

SUMMARY

This invention concerns a machine for feeding baled hay or forage to livestock. The machine comprises a mobile platform carrying a quantity of baled hay and a device for cutting the baled hay into relatively small palatable masses and conveying the cut hay from the platform to the livestock.

DESCRIPTION

Figure 2:
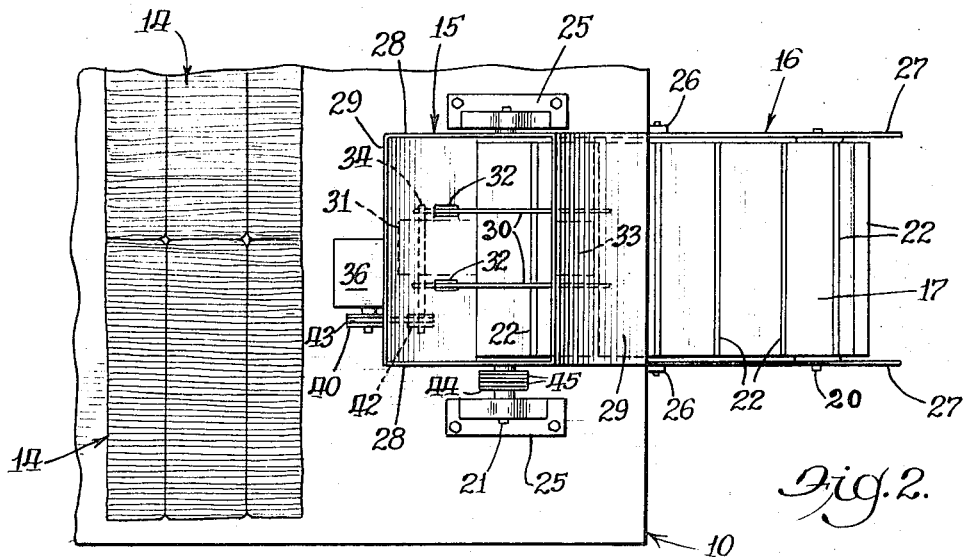
FIG. 2 is a top plan view of the structure shown in FIG. 1.

Generally, the present invention solves the problem of feeding a relatively large number of bales of hay or forage in a palatable fragmented condition to a relatively large herd of cattle or other livestock with a minimum of manual labor. An important feature of the invention is that it permits an operator to quickly distribute a long pile of palatable hay directly into a feed trough or bunk. Speed is important because a herd of cattle will tend to push and crowd when receiving feed and it is therefore highly desirable to quickly distribute feed to a herd to avoid crowding and possible injury. Depositing feed directly in a feed trough is also important because the feed is thereby kept clean and feed losses encountered when bales of hay are tossed upon the ground among the herd are avoided. That the hay be presented to the livestock such as cattle in a palatable condition is obviously important to produce maximum weight gains for a given quantity of feed. Known machines that finely chop or mill hay produce a forage that is generally unpalatable to cattle and usually must be mixed with other feeds such as grain to be rendered palatable. The importance of the feature of the invention in saving labor in feeding baled hay to relatively large herds is also obvious.

As shown in the drawing the invention comprises a mobile platform 10, of which only the right rear portion is shown. It should be understood that the mobile platform 10 may be a wagon drawn by a tractor or a platform carried on a truck. One of the wheels 11 supporting the platform 10 is shown on an axle 12. The axle 12 which is a rear axle and the forward axle (not shown) carry a pair of spaced apart beams such as 13 which in turn support the platform 10. The platform 10 should be large enough to carry a substantial number of bales of hay, for example 100 bales. A number of bales are shown at 14.

The platform 10 also carrys the device for cutting the baled hay into relatively small palatable masses and conveying the cut hay from the platform to the livestock. That device comprises a cutter 15 and a conveyor 16. Although any known type of conveyor suitable for the purposes of the invention may be used, the conveyor 16 is shown as a belt conveyor having a continuous belt 17. The belt 17 is carried on a pair of rollers 18 and 19. Roller 18 is rotatively carried on a shaft 20. Roller 19 is the drive roller for the belt 17 and is keyed to the shaft 21. The belt 17 is provided with a number of transversely aligned and longitudinally spaced apart slats 22.

The conveyor 16 further comprises a pair of side frame members 23. The shaft 20 is secured between the extending ends of the frame members 23. Suitable bearings are provided to rotatively carry the shaft 21 through the frame members 23. The frame members 23 are further supported in a spaced apart relationship by a plate 24 secured between the frame members 23 and extending between the rollers 18 and 19 immediately below the upper flight of the belt 17. In operation, the upper flight of the belt 17 slides upon the upper surface of the plate 24.

A pair of stands 25 which support the conveyor 16 are secured on the platform 10 so that the outlet end of the conveyor 16 extends beyond one longitudinal side of the platform 10. Suitable bearings are provided in the upper ends of the stands 25 and the shaft 21 extends therethrough. This arrangement permits the extending end of the conveyor 16 to be vertically adjusted in relation to a feed trough or bunk. The conveyor is maintained in any adjusted position by a pair of struts 26. The struts 26 are secured between the frame member 23 and the platform 10.

A pair of side wall plates 27 are mounted on the top edges of the frame members 23 to confine the cut hay on the belt 17 and to support the cutter 15. The cutter 15 preferably comprises a machine such as shown in my copending patent application entitled Hay Bale Cutter and mailed Feb. 24, 1970. Reference is made to that application for a more detailed description of the cutter. The cutter 15 comprises a cutting chamber of four side walls 28 and 29. The side walls 28 are secured to side wall plates 27 and the upper and lower sides of the cutting chamber are open.

A pair of continuous chain cutters are provided and include cutting chains carried on guide bars and drive sprockets. The guide bars of the cutters 30 are carried on a support member 31. The support member 31 is secured to the outward surface of one of the side walls 28 and carries the chain cutters 30 through slots 32 in the wall 28 in a horizontally spaced apart relationship and to extend as a cantilever toward the opposite side wall 28. A deflector 33 is mounted on that opposite side wall 28 between the extending ends of the chain cutters 30. The cutting chains of the chain cutters 30 are driven by a shaft 34. The shaft 34 is rotatively carried in suitable bearings carried by the support member 31, and the drive sprockets of the chain cutters 30 are keyed on the shaft 34.

Figure 1:
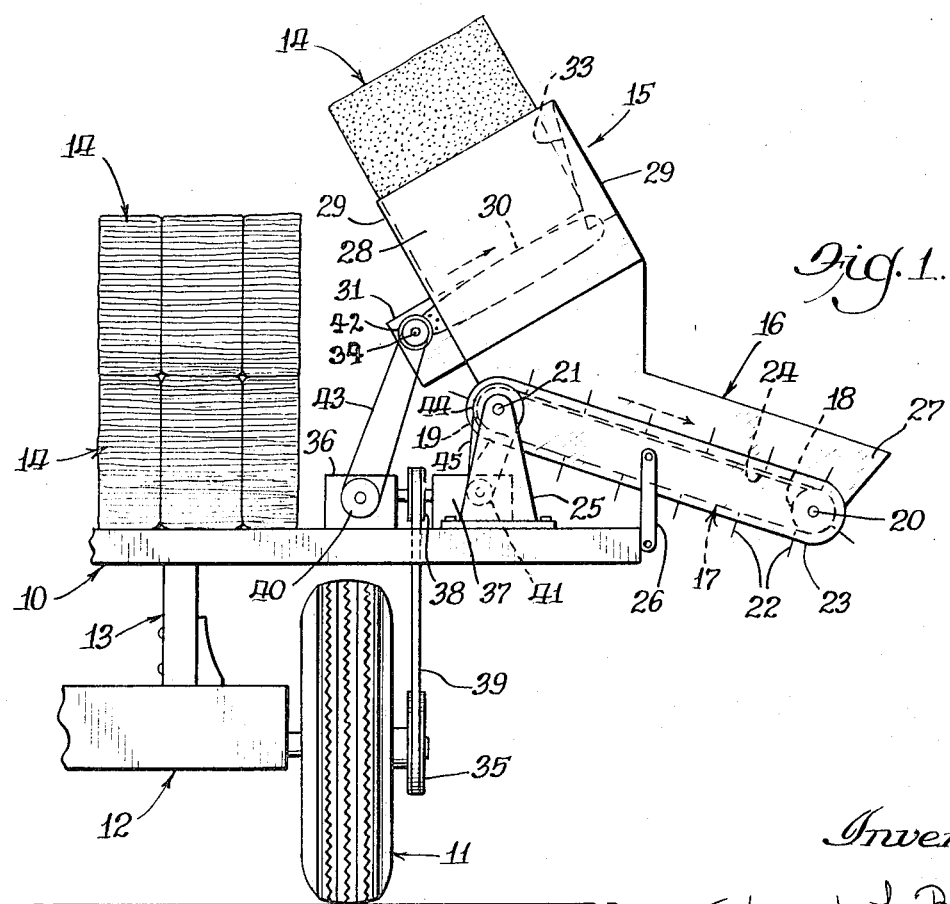
FIG. 1 is an end elevational view of one embodiment of the invention.

In the present embodiment of the invention the cutter 15 and conveyor 16 are driven from the wheel 11 so that as the platform 10 is moved along the length of a feed trough, the cutter 15 and conveyor 16 are operated. It is contemplated that other power means such as a gasoline engine can be used to operate the cutter 15 and conveyor 16. As shown a pulley 35 is mounted on the wheel 11 to rotate therewith. Two speed changers 36 and 37 are mounted on the platform 10 above the pulley 35. In FIG. 2 the speed changer 37 is beneath the cutter 15. The input shafts of the speed changers 36 and 37 are keyed to a pulley 38. A V-belt 39 is mounted about the pulleys 35 and 38 and through the platform 10 so that as the platform 10 is moved the speed changers 36 and 37 are operated. A sheave 40 is keyed on the output shaft of the speed changer 36 and a sheave 41 is keyed on the output shaft of the speed changer 37. A sheave 42 is keyed on the shaft 34. A set of V-belts 43 are carried about the sheaves 40 and 42 for driving the chain cutters 30 from the speed changer 36. A sheave 44 is keyed on the shaft 21. A set of V-belts 45 are carried about the sheaves 41 and 44 for driving the belt 17 from the speed changer 37. The speed changers 36 and 37 are so constructed that the chain cutters 30 and the belt 17 will move in the direction of the arrows shown in FIG. 1.

In the operation of the invention a person stands upon the platform 10 as it is moved and picks up and deposits the bales of hay in the open upper side of the cutter 15. The cutter 15 cuts the bales of hay, and the cut hay, as relatively small masses, is deposited onto the conveyor 16. From the conveyor 16 the cut hay is delivered to the feed bunk being transversed by the moving platform 10. The invention in operating as described will quickly provide a palatable pile of hay or other forage down the length of a feed bunk for a relatively large herd of livestock with a minimum of manual labor.

The actual operating speeds of the various components will of course depend primarily upon the size of the herd being fed. As a general rule, the larger the herd of livestock the more quickly the platform must be moved to avoid crowding of the herd. Generally, speed changer 37 and the sheaves 41 and 44 should be selected to produce a belt 17 speed about one and a half times the ground speed of the platform 10, and the speed changer 36 and the sheaves 40 and 42 should be selected to produce a chain cutter 30 speed about 40 times the ground speed of the platform 10. Considering an example, one adequate ground speed of the platform 10 is 60 feet per minute. With that ground speed, a belt 17 speed of 100 feet per minute and a chain cutter 30 speed of 2,650 feet per minute, will provide an adequate pile of hay in a feed bunk being transversed by the platform 10.

Having described the invention, what is considered new and desired to be protected by Letters Patent is:

1. An apparatus for feeding baled hay to livestock comprising, a mobile platform moveable past said livestock, said platform being formed to carry a plurality of bales of baled hay, a hay bale cutter having a first opening for receiving a bale of hay and a second opening for discharging small masses of cut hay therefrom, means in said cutter operating to cut a bale of hay received in said first opening into small masses of cut hay and directing said cut hay to said second opening, said cutter mounted on one side of said platform, and a conveyor operable to receive cut hay on one end thereof and to deliver and drop said cut hay from the other end thereof, said conveyor mounted on said platform so that said one end thereof is disposed in receiving relation to said cut hay discharged from said second opening of said cutter and so that said other end thereof is disposed as a cantilever over said one side of said platform, whereby cut hay is dropped from said conveyor to said livestock as said platform is moved past said livestock and as baled hay carried on said platform is deposited in said cutter, said hay bale cutter comprising a bale cutting chamber between said first and second openings, a plurality of elongated cutter assemblies, support means carrying said cutter assemblies in a parallel spaced apart relationship to extend substantially across said cutting chamber, said cutter being mounted on said platform so that said first opening is substantially vertically above said second opening, and said one end of said conveyor is disposed below said second opening, whereby a bale of hay deposited in said first opening is moved through said cutting chamber under the force of gravity and the small masses of cut hay are discharged from said second opening onto said one end of said conveyor under the force of gravity.

2. In an apparatus as defined in claim 1, each of said cutter assemblies comprising a continuous cutting chain carried on a guide bar, each of said guide bars mounted on said support means to position the plane of the cutting chain carried thereon parallel to the axis of said chamber extending between said first and second openings.

* * * * *